May 1, 1962
E. KEZNICKL
3,032,002
ACOUSTIC INDICATOR FOR MOTION PICTURE CAMERAS
Filed July 10, 1959
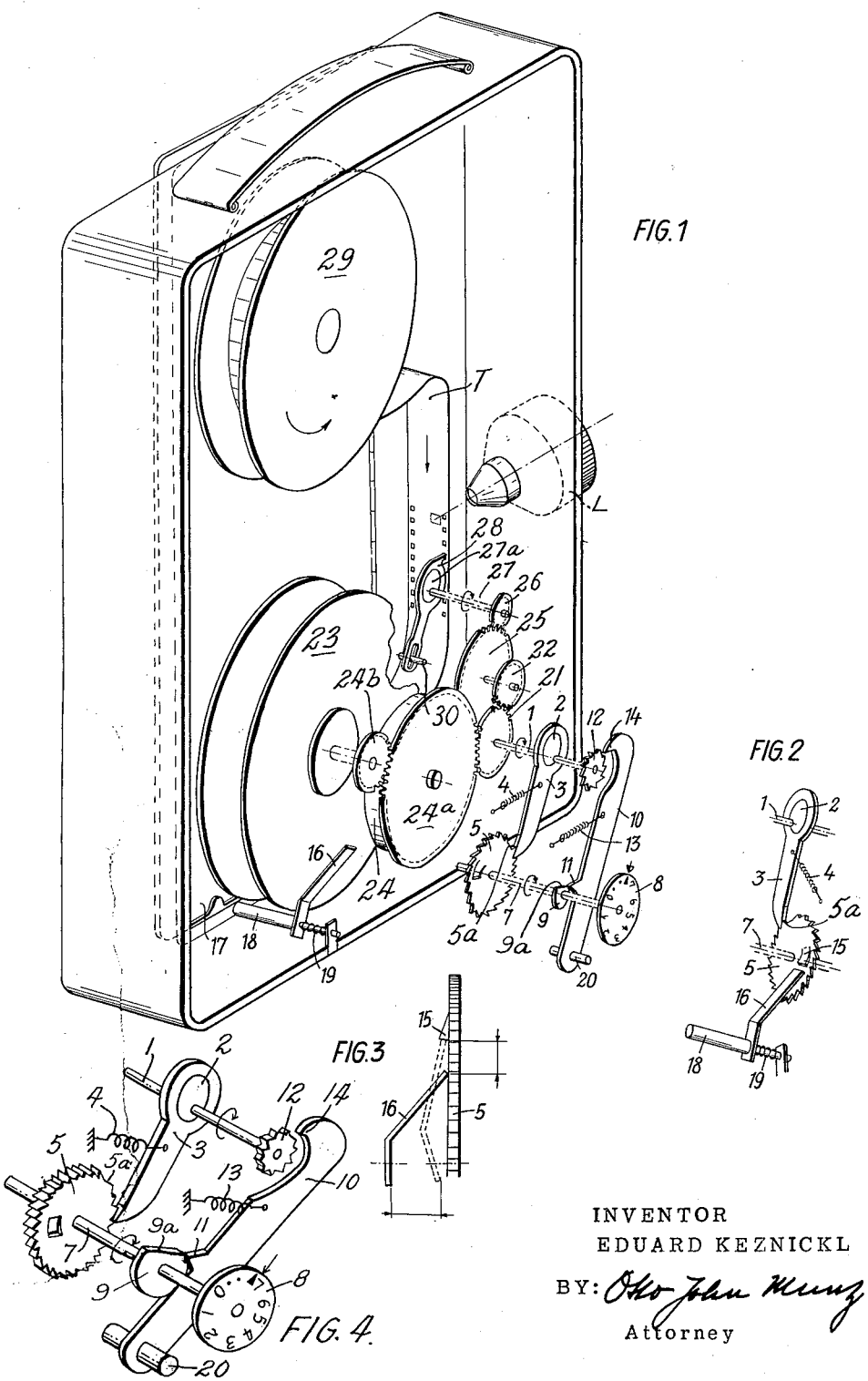
INVENTOR
EDUARD KEZNICKL
BY: Otto John Munz
Attorney

United States Patent Office 3,032,002
Patented May 1, 1962

3,032,002
ACOUSTIC INDICATOR FOR MOTION PICTURE CAMERAS
Eduard Keznickl, Vienna, Austria, assignor to Alois Handler, Vienna, Austria, and Karl Vockenhuber, Vienna, Austria
Filed July 10, 1959, Ser. No. 826,149
Claims priority, application Austria July 22, 1958
1 Claim. (Cl. 116—114)

This invention relates generally to motion picture cameras and more particularly to an acoustic indicator for use in motion picture cameras.

Film on so-called spool charges is most widely used in amateur motion picture cameras. These cameras can be charged by daylight. In order to protect the film against incidence of light when loading and unloading the camera, the film has on its two opposite ends additional lengths or strips having the same emulsion-coating as the rest of the film. These end portions of the film are called leader and trailer and are of ample length to avoid an incidence of light on the main part of the film, intermediate the leader and trailer, even under the most unfavorable conditions in which the camera is charged. The known double-8 mm. spool charges, for example, have a length of about 7.5 meters on the main part of the film and have a leader and trailer on the film of about 2.5 meters altogether.

Experience has shown that when the film is carefully inserted in a camera relatively long lengths of film remain unexposed between the outermost portions of the leader and trailer respectively which are spoiled due to the incidence of light. Therefore, many amateurs have taken to using the unexposed portions of the leader and trailer for exposures in order to reduce their film costs. However, since it is not known what length of film is spoiled by light during loading and unloading of the camera, and because marks, which further spoil these short film portions, are punched into the leader and trailer of the film, the leader and trailer are generally used only for shooting scenes of minor importance.

It is a principal object of the invention to provide an arrangement that calls the operator's attention during exposure of the leader and trailer to that fact by an audible signal.

Another object of the invention is to provide an acoustic indicating means controlled by a film footage indicator on a camera and effective to generate audible signals only then when the leader and trailer of the film are susceptible of exposure during advancement of the film. The acoustic indicating means, however, is out of operation or ineffective during the exposure of the main portion of the film intermediate the leader and trailer.

Other objects and the many advantages of this invention will be readily appreciated as the same becomes better understood by reference to the following detailed description when considered in connection with the accompanying drawings in which like reference numerals designate like parts throughout the figures thereof and wherein:

FIG. 1 is a diagrammatic perspective and partially exploded view of a motion picture camera with a side removed and provided with the new and novel acoustic indicator according to the invention, and is illustrative of the overall arrangement of the new acoustic indicator;

FIGS. 2 and 3 are diagrammatic views of details of the arrangement according to FIG. 1;

FIG. 4 is a perspective view on an enlarged scale of a part of the arrangement in FIG. 1.

In an embodiment of the invention according to the drawing a motor 24 provided with a drive gear 24a drives a film take-up spool 23 through a gear 24b. The drive gear 24a drives a gear train comprising gears 21, 22, 25 and 26. These gears in the train have the proper ratio to control the speed of a shaft 27 to which is attached an eccentric or eccentrically mounted cam 27a. The eccentric cam 27a reciprocates a feed claw 28, which is slidably mounted on a stub shaft 30, in such a manner as to engage holes in a film T and advance the film longitudinally from a film reel or spool 29 past the camera lens L for exposure.

The first gear 21 of the train, which is driven by the drive gear 24a, is mounted on a shaft 1 which rotates an eccentric 2 mounted thereon causing a pawl 3 to rotate a ratchet wheel 5. The pawl 3 is constantly biased into engagement with the ratchet wheel 5 by a spring 4. The ratchet wheel 5 is mounted on a shaft 7 to which is attached a rotary disc 8 calibrated to form a film footage indicator for visually indicating the footage of film advanced during operation for exposure. The ratchet wheel 5 has a flat 5a in place of at least one tooth, into which the pawl 3 engages after the entire spool of film has been advanced for exposure, thereby interrupting the rotation of the disc 8. A single tooth 15 is formed laterally on a side face of the ratchet wheel 5. This single tooth coacts with another pawl 16 which has two arms and is flexible for the reason later described.

The above-described arrangement operates as follows:

After the entire length of film has been exposed the pawl 3 engages in the flat 5a of the ratchet wheel 5. As long as the cover 17 of the camera is closed, after advancement of the entire length of film for exposure, the pawl 16 rests on the tooth 15. Upon opening the cover the pawl 16 is shifted toward the left by a spring 19 and its free end or arm slides over the surface of the tooth 15 to lie directly ahead in the path of the tooth. When the cover 17 is closed again a tube 18 presses the lower arm of the pawl 16 towards the ratchet wheel 5 causing the free arm of the pawl 16 to deflect upwardly, thereby turning the ratchet wheel 5 by engaging the underside of the tooth 15 as shown in FIG. 3 until the disc 8 reaches a start position corresponding to the zero position. Simultaneously, the pawl 3 re-engages the teeth of the ratchet wheel 5.

The disc 8 serves as a film footage indicator and bears a calibrated scale having markings or indications co-operating with a stationary mark and indicating the film footage exposed. A cam 9 is fixed to the shaft 7 of the film footage indicator. This cam 9 consists of a rotary second disc bevelled at 9a. The cam 9 is faced by a pivoted second pawl 10 pivoted on a shaft 20 and is provided with cam follower means 11. The pawl 10 and its cam follower 11 are constantly pressed against the cam 9 by means of a spring 13. The cam 9 is formed in such a way that during the advancement of the main portion of the film, i.e. when the indicator 8 indicated on its scale the values 0 to 7.5 a prolongation 14 of the pawl 10 and a toothed third disc 12 are disengaged. The toothed disc 12 is mounted on a shaft 1 of the gear 21 and rotates during the advancement of the film.

When starting from the position shown in FIG. 4, if the camera is on an "on" condition the shaft 1 rotates in a clockwise direction. The ratchet wheel 5 is stepped in clockwise direction through the eccentric 2 and the ratchet 3. The film T is assumed to have had the main portion thereon exposed.

It is to be understood that as soon as the main portion of the film has been exposed, the end of the main portion of the film is indicated on the disc 8 by a black triangle, the cam follower means 11 arrives at the bevelled part 9a of the cam 9 as shown in FIG. 4. In the "on" condition since the pawl 10 is rotated in a clockwise direction by the spring 13, a ratchet nose or hook 14 of the pawl 10 engages the rotating toothed disc 12. As a consequence of the rotation of the shaft 1 the ratchet 14 in this position engages the teeth of the wheel 12 and slides off from one saw tooth of the toothed disc 12 to the other whereby audible clicking signals are generated. These signals indicate to the camera operator that the trailer is being advanced into position for exposure.

After changing the film audible signals are likewise released during the advancement of the leader. These signals stop as soon as the scale value 0 of the film footage indicating disc 8 is in registry with the stationary mark, because at this time the cam follower means 11 leaves the bevelled part of the cam 9 and the arcuate surface of the cam is engaged by the follower means. The arcuate surface of the cam has longer radii from the axis of rotation than the bevelled surface so that the pawl 10 is rotated in a clockwise direction thereby the ratchet hook 14 of the pawl 10 and the rotating toothed disc 12 are disengaged and the audible signals cease. Upon cessation of the audible signals the main part of the film constituting the film length intermediate the leader and trailer is advanced for exposure and the cessation of signals indicates this to the operator. It should be noticed that the cam 9 is rotated substantially one revolution during the advancement of the entire length of film including the leader and trailer portions.

By this arrangement control of the acoustic indicating means in dependence upon the position of the film footage indicating disc is attained. The acoustic indication of the advancement of the leader and trailer respectively into position for exposure permits an extremely economical utilization of the film and offers a maximum safety against errors in manipulation.

What I claim and desire to secure by Letters Patent is:

In a motion picture camera having a driven film footage indicator for visually indicating the footage of film advanced in operation in a given direction corresponding to a direction for exposure of said film, and means for driving said indicator, the improvement which comprises means for generating audible signals for audibly indicating when preselected lengths of the film constituting leader and trailer portions at opposite ends of the film respectively are susceptible to exposure during advancement of said film for exposure during operation of said camera comprising, a rotatably mounted toothed disc, means for driving said toothed disc when said footage indicator is driven, a pivoted pawl, means constantly biasing said pawl into engagement with said toothed disc for slidably engaging the individual teeth of said disc and thereby generating audible discrete signals in conjunction with the individual teeth of said disc when said disc is rotatably driven, a rotatably mounted cam driven rotatably when said footage indicator is driven, means for driving said cam substantially one revolution during operation corresponding to the advancement of the entire length of film including said leader and said trailer into position for exposure, cam follower means on said pawl, and said cam having a camming surface cooperative with said cam follower means for holding said pawl spaced apart from said disc during indications by said indicator corresponding to the advancement of a film length corresponding to the film intermediate said leader and trailer lengths thereby to render the audible signal indicating means ineffective during advancement of film intermediate said opposite ends into a position in which said film is susceptible of exposure.

References Cited in the file of this patent

UNITED STATES PATENTS

| | | |
|---|---|---|
| 1,841,748 | Marks | Jan. 19, 1932 |
| 2,354,273 | Older | July 25, 1944 |
| 2,573,994 | Shepard | Nov. 6, 1951 |